United States Patent
Ysker

[11] Patent Number: 5,984,342
[45] Date of Patent: Nov. 16, 1999

[54] VEHICLE TOWING APPARATUS

[75] Inventor: John A. Ysker, Minneapolis, Minn.

[73] Assignee: Thunderbolt Enterprises, Inc., Minneapolis, Minn.

[21] Appl. No.: 08/794,197

[22] Filed: Jan. 24, 1997

[51] Int. Cl.⁶ ................................................. B62K 27/00
[52] U.S. Cl. ........................... 280/492; 280/78; 280/475
[58] Field of Search ............................ 280/78, 492, 493, 280/494, 763.1, 764.1, 765.1, 766.1, 515, 475, 204

[56] References Cited

U.S. PATENT DOCUMENTS

| | | | |
|---|---|---|---|
| 2,009,548 | 7/1935 | Goin et al. | 280/78 |
| 2,526,866 | 10/1950 | Hersey et al. | 280/78 |
| 2,568,261 | 9/1951 | Stade | 280/78 |
| 2,580,538 | 1/1952 | Gentsch | 280/78 |
| 3,937,489 | 2/1976 | Hawes et al. | 280/204 |
| 4,372,569 | 2/1983 | Otterson | 280/78 |
| 4,413,835 | 11/1983 | Hazelett | 280/204 |
| 4,511,155 | 4/1985 | Galloway | 280/204 |
| 4,515,394 | 5/1985 | Zwick | 280/764.1 |
| 4,548,423 | 10/1985 | Craven | 280/204 |
| 4,645,230 | 2/1987 | Hammons | 280/78 |
| 4,708,362 | 11/1987 | Raetz | 280/763.1 |
| 5,205,586 | 4/1993 | Tallman | 280/764.1 |
| 5,240,266 | 8/1993 | Kelley et al. | 280/204 |
| 5,573,259 | 11/1996 | Castillo et al. | 280/204 |
| 5,641,173 | 6/1997 | Cobb, Jr. | 280/204 |

Primary Examiner—Kevin Hurley
Attorney, Agent, or Firm—Nawrocki, Rooney & Siverston, P.A.

[57] ABSTRACT

A towing apparatus for motorcycles and recreational vehicles having a single-wheel design. A storage box is supported by the single wheel through a swing arm and dampening assembly arrangement which dampens and absorbs shock and vibration from the ground surface. The swing arm provides movement of the single wheel along a plane parallel to the plane of rotation of the vehicle wheels. The towing apparatus couples to the trailer hitch of the motorcycle or recreational vehicle through a universal type mounting hitch which maintains the trailer in rotational alignment with the trailer hitch.

29 Claims, 5 Drawing Sheets

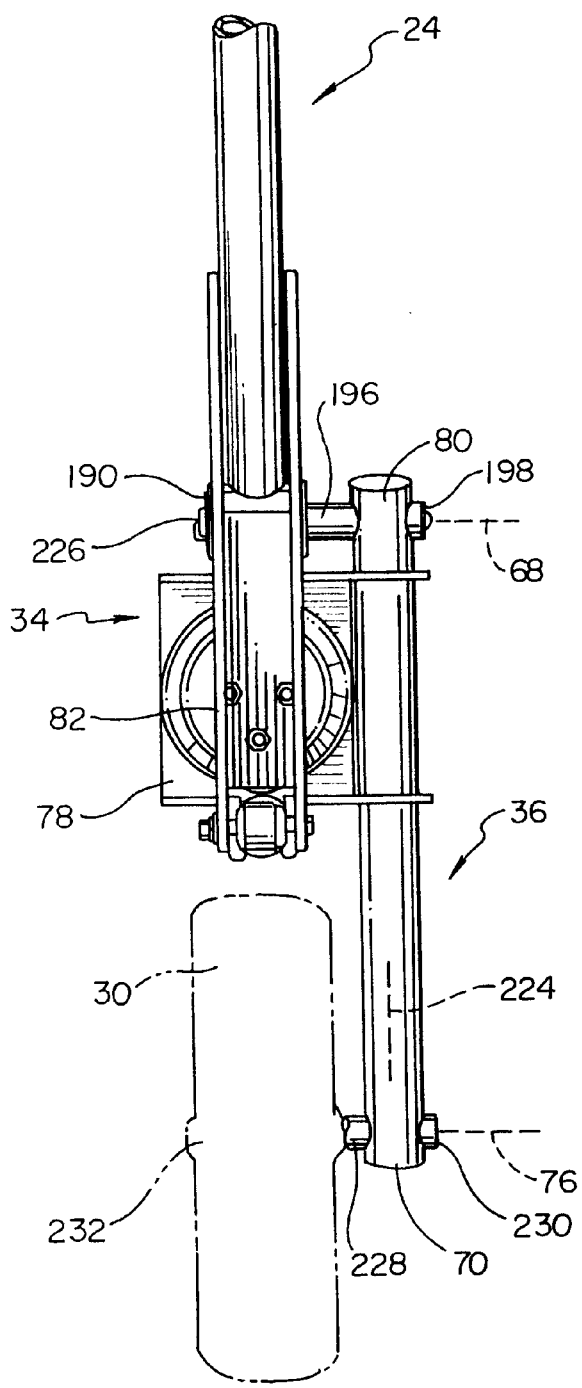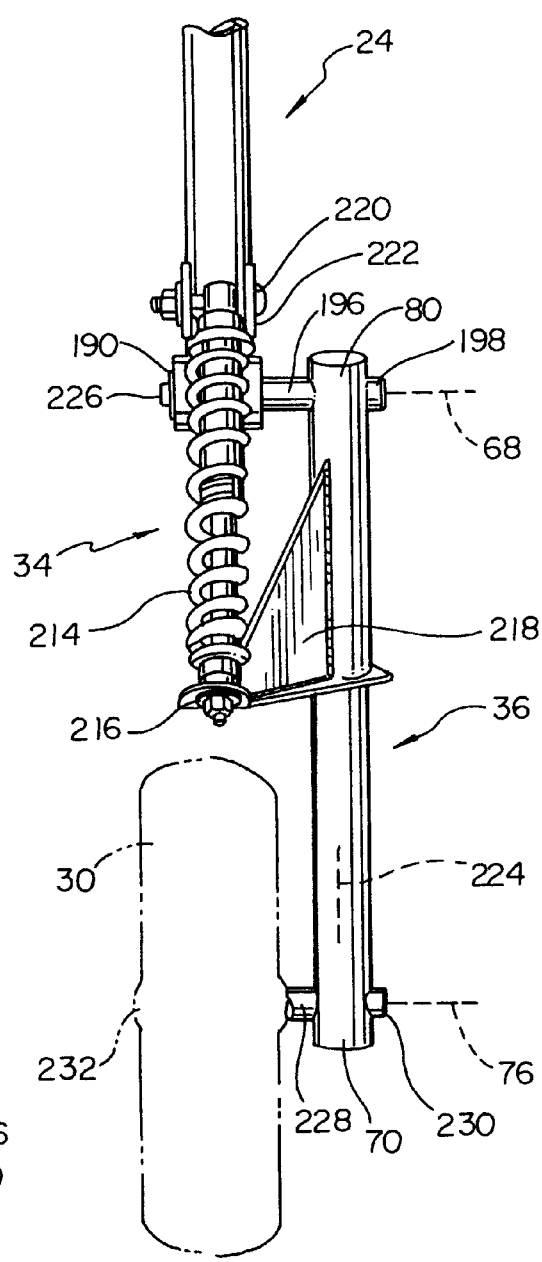

VEHICLE TOWING APPARATUS

BACKGROUND OF THE INVENTION

1. Field of the Invention

This invention relates to a towing apparatus for motorized vehicles. More particularly it relates to a towing apparatus having a single wheel design to be towed behind a motorcycle or recreational vehicle.

2. Description of the Prior Art

In motorized vehicles, such as two or three-wheeled motorcycles and recreational vehicles, it is desirable to have a trailer assembly which is compact in size and light in weight. Motorcycles and recreational vehicles are typically powered by small displacement engines having four or fewer cylinders. In addition, motorcycles and recreational vehicles typically have small total vehicle weights. Thus a motorcycle towing apparatus must be compatible in weight to provide for easy and efficient towing behind the motorcycle or recreational vehicle. Towing a trailer with a motorcycle or recreational vehicle may increase the risk of injury to an operator or a passenger. Hitting an obstruction on the road surface with a wheel of the motorcycle or trailer may cause the two or three wheeled motorcycle to lose control. Thus it is desirable to provide a motorcycle towing apparatus which enhances operator and passenger safety by minimizing the risk of hitting an obstruction on the road surface by minimizing the "footprint" of the combination of the motorcycle or recreational vehicle and trailer wheels on the road surface. It is also desirable to enhance operator and passenger safety by providing a motorcycle towing apparatus having handling characteristics compatible with the two-wheeled motorcycle design.

In the past, towing apparatus for motorcycles and recreational vehicles have utilized designs incorporating two wheels. Typically these designs are derived from applications within the automotive industry and may not accommodate the particular needs of two and three-wheeled motorcycles. First, the two-wheeled design inherently provides two wheels which do not "ride" the same track as the front and rear wheels of the two-wheeled and three-wheeled motorcycles. For example, the three-wheeled motorcycle has a "footprint" of three wheels on the road surface. If the three-wheeled motorcycle is towing a trailer which has two wheels, the total "footprint" of five wheels on the road surface may make it unsafe to operate the three-wheeled motorcycle. If an obstruction is on the road surface, it may be difficult to avoid that obstruction with a "footprint" of five wheels thus subjecting the operator and passenger to an enhanced risk of injury. Although two-wheeled motorcycle designs towing a two-wheeled trailer have a "footprint" of three wheels, thus making it easier to avoid an obstruction on the road surface, the operator and passenger still have an enhanced risk of injury due to a possibility of tipping over. Another problem of towing the two-wheeled trailer is that while the operator may easily look forward and concentrate on keeping the front and rear wheel of a motorcycle out of an obstruction related to a road hazard, it is not easy to do the same with the two trailer wheels since the trailer wheels are behind the line of vision of the operator. Unfortunately, injury to the motorcycle operator or passenger may result if one or both of the two trailer wheels comes into contact with the obstruction.

Another problem is that the two-wheeled trailer does not have handling characteristics compatible with the two-wheeled motorcycle design. Typically the two-wheeled motorcycle negotiates a turn by steering the motorcycle to initiate a weight shifting in order to lean the motorcycle into the turn. Unfortunately, the two-wheeled trailer design is not compatible with the two-wheel motorcycle design as it does not similarly lean thus making it more difficult for the motorcycle operator to safely predict the handling of the trailer. In addition, the ball and hitch assembly typically used to couple the trailer to the motorcycle may limit the amount of lean of the motorcycle relative to the trailer.

In one approach in the prior art, a one-wheeled trailer design is coupled to the vehicle via two hingeable support arms where the one wheel trailer follows the vehicle by a castering type action. While this approach does provide the advantage of minimizing the footprint of the motorcycle and trailer combination, it has at least two disadvantages. First, since two hingible supports are utilized to couple the trailer to the motorcycle, a pendulum effect is created tending to shift the back end of the vehicle to the outside of the turning radius resulting in a loss of control of the motorcycle. Second, the single castor-type wheel is subject to higher vibration due to the side-to-side motion possible with the castor design. This additional vibration may cause operator or passenger discomfort, or worse, may cause loss of control of the motorcycle if severe enough.

SUMMARY OF THE INVENTION

Accordingly, it is an object of the invention to provide a towing apparatus for motor cycles and recreational vehicles having a single wheel design, wherein a storage box is supported by the single wheel through a swing arm and dampening assembly arrangement which dampens and absorbs shock and vibration from the road. The swing arm provides movement of the single wheel along a plane parallel to the plane of rotation of the vehicle wheels. The towing apparatus couples to the trailer hitch of a motorcycle or recreational vehicle through a universal type mounting hitch which maintains the trailer in rotational alignment with the trailer hitch.

In a preferred embodiment of the present invention, a towing apparatus is provided to tow behind a vehicle having a trailer hitch where the towing apparatus comprises an elongate frame member, a hitch member demountably attached to the trailer hitch to couple the towing apparatus to the trailer hitch, a universal joint pivotably attached to a proximal end of the frame member and to a distal end of the hitch member to maintain the frame member and the hitch member in rotational alignment. The towing apparatus of the preferred embodiment further comprises a control arm where a proximal end of the control arm is pivotally attached to the frame member adjacent a distal end of the frame member, a trailer wheel to support the control arm on a ground surface, where the trailer wheel is rotatably attached to a distal end of the control arm, and a dampening assembly attached at a lower end between the proximal end and the distal end of the control arm, where the dampening assembly is attached at an upper end to the distal end of the frame member and resiliently supports the frame member on the control arm. In the preferred embodiment, the towing apparatus further comprises a storage box securely attached to the frame member to provide storage capacity to hold a variety of objects. The storage box is open on a top side, and has a hinge hingedly attached to the top side of the storage box to provide access to the interior of the storage box, where the lid may be closed to seal the top side of the storage box and fully enclose an interior of the storage box.

In the preferred embodiment, the towing apparatus further includes an adjustable support mounted between the proximal and the distal end of the frame member to support the towing apparatus at two or more points on the ground surface when the towing apparatus is not mounted to the trailer hitch. The adjustable support provides stabilizing support for the towing apparatus in combination with the trailer wheel. In the preferred embodiment, the adjustable support of the towing apparatus further comprises an elongate channel base member mounted perpendicular to the axis of the frame member and parallel to the ground surface where the channel base member has a downwardly facing channel open to the ground surface. The adjustable support comprises a threaded rod slidably supported at a lower end by the frame member where the threaded rod is positioned perpendicular to the plane of an axis of the channel base member and an axis of the frame member, and a bolt threadably attached to an upper end of the threaded rod. The adjustable support comprises a right support arm hingedly attached at an upper end to a right side of the bolt to pivot in a plane perpendicular to the axis of the frame member where the right support arm is slidably received and supported by a right opening in the channel base member, where the right opening is positioned between a right end and the frame member. The right support arm has a right surface contact means attached at a lower end of the right support arm to engage the ground surface and provide support for the right support arm. The adjustable support comprises a left support arm hingedly attached at an upper end to a left side of the bolt to pivot in a plane perpendicular to the axis of the frame member where the left support arm is slidably received and supported by a left opening in the channeled base member, where the left opening is positioned between a left end and the frame member. The left support arm has a left surface contact means attached at a lower end of the left support arm to engage the ground surface and provide support for the left support arm. The preferred embodiment further comprises a hand crank hingedly attached to an upper end of the threaded rod to rotate the threaded rod, where a rotation in a first direction slidably moves the right support arm through the right opening until the right surface contact means engages the ground surface and slidably moves the right support arm through the left opening until the left surface contact means engages the ground surface, where the right surface contact means and the left surface contact means supports the towing apparatus on the ground surface. In the preferred embodiment, a rotation in a second direction retracts the right surface contact means into a right portion of the channel proximate the right opening and retracts the left surface contact means into a left portion of the channel proximate the left opening. In a preferred embodiment, the right surface contact means may comprise a right caster wheel attached at a lower end of the right support arm to swivel at a lower end of the right support arm, where the right caster wheel is sized to be received in the right portion of the channel approximate the right opening. In the preferred embodiment, left surface contact means may comprise a left caster wheel attached at a lower end of the left support arm to swivel at the lower end of the left support arm, where the caster wheel is sized to be received in the left portion of the channel proximate the left opening.

In the preferred embodiment, the universal joint comprises a rear bearing caliper attached at a proximal end of the frame member. The universal joint further comprises a universal bearing array pivotably attached to the rear bearing caliper so that the frame member pivots about a first axis of the universal bearing array, where the first axis is perpendicular to the axis of the frame member and parallel to the ground surface, and where the frame member rotates about the first axis of the universal bearing array in a plane perpendicular to the ground surface. The universal joint further comprises a front bearing caliper attached to a distal end of the hitch member, where the front bearing caliper is pivotably attached to the universal bearing array so that the hitch member may pivot about a second axis of universal bearing array, where the second axis is perpendicular to the first axis of the universal bearing array and to an axis of the hitch member.

In the preferred embodiment of the present invention, the hitch member comprises a round shaft aligned with the axis of the hitch member and has a plurality of longitudinal splines where the shaft is slidably received into aligned splines of a bore in the trailer hitch, where the aligned splines prevent rotation of the hitch member about the axis of the hitch member. The hitch member is further comprised of a hitch pin being removably inserted into the trailer hitch and extending in to an aligned bore of the shaft, where the bore has an axis perpendicular to the axis of the hitch member, where the hitch pin is inserted to prevent longitudinal movement of the hitch member in a direction parallel to the axis of the hitch member. In the preferred embodiment, the hitch pin further comprises a locking means to lock the hitch pin in the aligned bore of the shaft, where the hitch pin is removable from the aligned bore of the shaft when the locking means is released.

In an alternative embodiment of the present invention, the hitch member is comprised of a square shaft aligned with the axis of the hitch member where the shaft is mated with and slidably received into a rectangular bore of the trailer hitch, where the rectangular bore prevents rotation of the hitch member about the axis of the hitch member. The hitch member of the alternative embodiment is further comprised of a hitch pin being removably inserted in the trailer hitch extending into an aligned bore of the shaft, where the shaft has an axis perpendicular to the axis of the hitch member, where the hitch pin is inserted to prevent longitudinal movement of the hitch member in a direction parallel to the axis of the hitch member. In the alternative embodiment of the present invention, the hitch pin further comprises locking means to lock the hitch pin in the aligned bore of the shaft, where the hitch pin is removable from the aligned bore of the shaft when the locking means is released.

In the preferred embodiment of the present invention, the towing apparatus further comprises a frame member having one or more bearings mounted at the distal end of the frame member to provide rotational support along an axis parallel to the first axis of the universal bearing array. The frame member further comprises an upper dampening support mounted at the distal end of the frame member to support an upper end of the dampening assembly. In the preferred embodiment, the one or more bearings may be one or more roller bearings.

In a preferred embodiment, the towing apparatus further comprises the control arm having a pivot axle fixed at a first end at the proximal end of the control arm where the pivot axle extends a distance perpendicular of the axis of the control arm, where the pivot axle is rotatably supported at a second end by the one or more bearings. The control arm further comprises a wheel axle fixed at a first end of the distal end of the control arm, where the wheel axle extends a distance perpendicular to the axis of the control arm, where the wheel axle is parallel to the pivot axis and is rotatably supported at a second end by the trailer wheel. The control arm further comprises a lower dampening support mounted between the proximal and the distal end of the control arm to support a lower end of the dampening assembly.

In the preferred embodiment, the towing apparatus may include the dampening assembly comprising a shock absorber hingedly attached at an upper end to the upper dampening support and at a lower end to the lower dampening support to dampen shock and vibration between the control arm and the frame member. The dampening assembly may further comprise a spring support means attached at an upper end to the upper dampening support and at a lower end to the lower dampening support to resiliently support the frame member. In the preferred embodiment, the upper end of the dampening assembly consists of the upper end of the shock absorber and the upper end of the spring support means, and the lower end of the dampening assembly consists of the lower end of the shock absorber and the lower end of the spring support means. In the preferred embodiment, the spring support means may be a pneumatic air spring. In an alternative embodiment, the spring support means may be a coil spring.

In an alternative embodiment, the towing apparatus may include a dampening assembly comprising a coil over shock absorber rigidly attached at an upper end to the upper dampening support and hingedly attached at a lower end to the lower dampening support to dampen shock and vibration between the control arm and the frame member and to resiliently support the frame member.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 is a top plan view showing the dampening assembly of a preferred embodiment of the present invention; and FIG. 9 is a top plan view showing the dampening assembly of an alternate embodiment of the present invention.

DETAILED DESCRIPTION OF THE PREFERRED EMBODIMENTS

Figure 1:
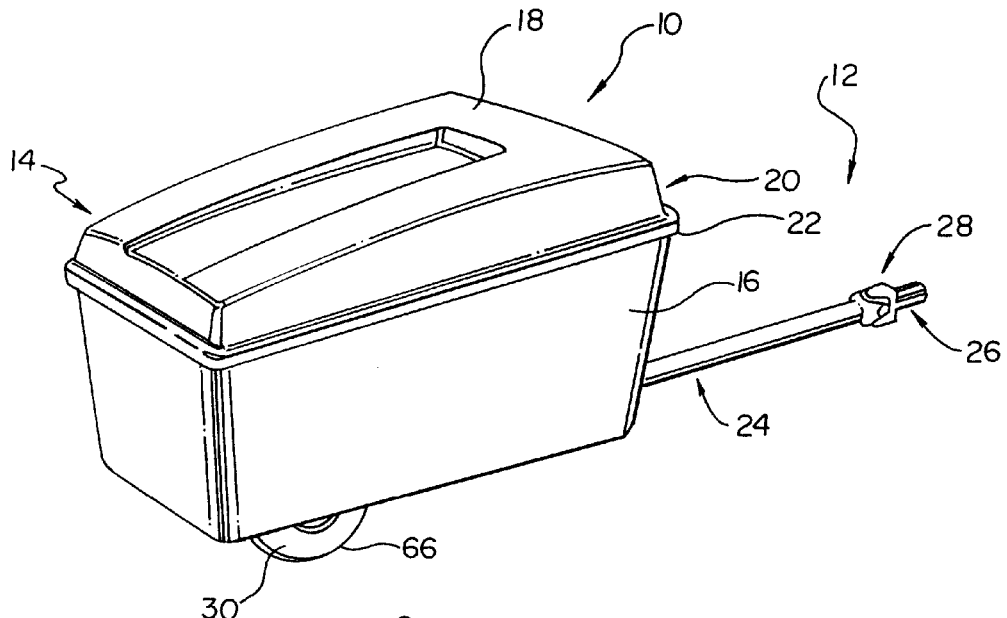
FIG. 1 is a perspective view of the "Vehicle Towing Apparatus" invention.

Referring now to the drawings, wherein like reference numerals refer to like elements throughout the several views, FIG. 1 is a perspective view of the vehicle towing apparatus invention. FIG. 1 shows generally a one-wheel trailer 10 having a towing apparatus 12 and storage compartment 14. Storage compartment 14 is further comprised of storage box 16 and lid 18. Lid 18 is hingedly attached to storage box 16 via hinges 20 (not shown) at a top side 22 of storage box 16. Storage box 16 is secured to frame member 24 by means not shown. FIG. 1 also shows hitch member 26, universal joint 28 and trailer wheel 30.

Figure 2:
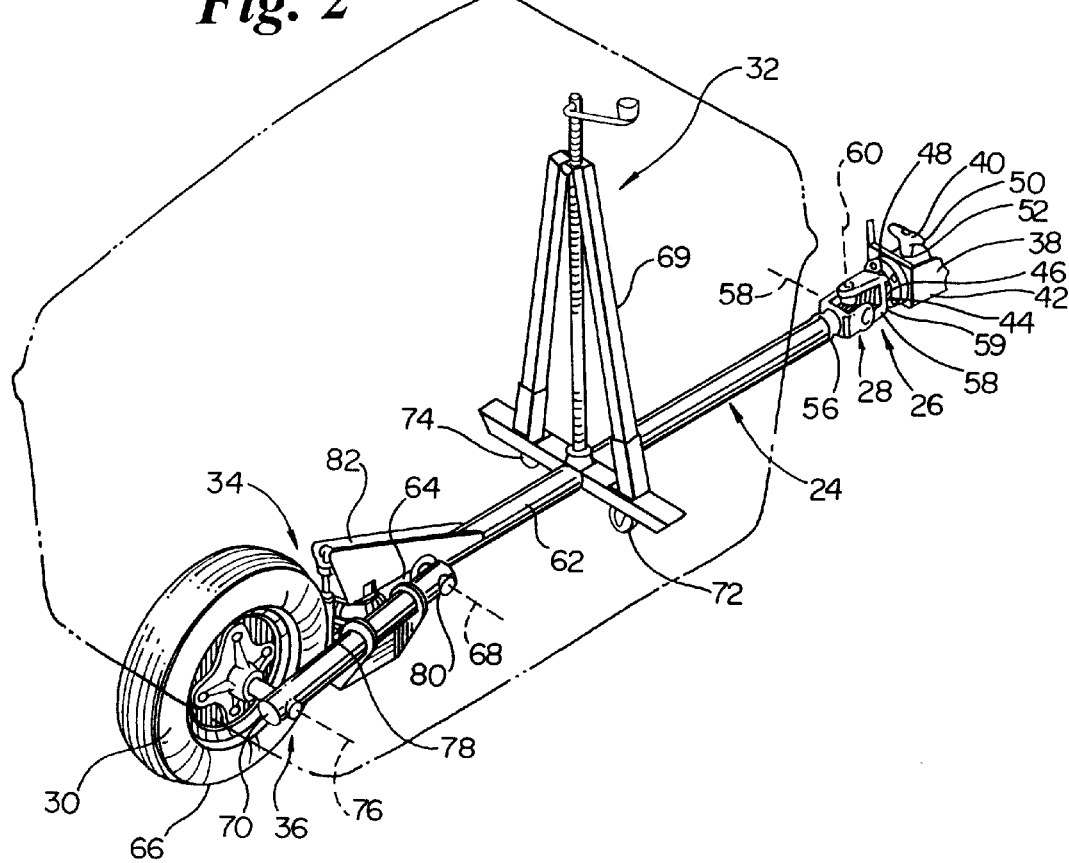
FIG. 2 is a perspective view of the vehicle towing apparatus.

FIG. 2 is a perspective view of the vehicle towing apparatus. The towing apparatus 12 includes hitch member 26, universal joint 28, frame member 24, adjustable support 32, dampening assembly 34, control arm 36, and trailer wheel 30. Hitch member 26 is demountably attached to trailer hitch 38 to couple towing apparatus 12 to trailer hitch 38. Hitch member 26 has a round shaft 42 having a plurality of longitudinal splines 44 at a proximal end 46, wherein the shaft 42 is slidably received into line splines 48 of trailer hitch 38. The line splines 48 prevent rotation of hitch member 26 about axis 38. Hitch pin 40 is removably inserted through hole 50 of trailer hitch 38 into an aligned bore 52 at proximal end 46 of shaft 42 (see also, FIG. 5). Hitch pin 40 being inserted into aligned bore 52 prevents longitudinal movement of hitch member 26 in a direction parallel to axis 54 of hitch member 26 (see also, FIG. 5). Universal joint 28 is pivotably attached to proximal end 56 of frame member 24 and to distal end 59 of hitch member 26 to maintain frame member 24 and hitch member 26 in rotational alignment (see also, FIG. 5). Universal joint 28 allows rotation of frame member 24 about first axis 58 and second axis 60. First axis 58 and second axis 60 are perpendicular to axis 62 of frame member 24. Adjustable support 32 is mounted between proximal end 56 and distal end 64 of frame member 24 to support towing apparatus 12 at two points on the ground surface 66 when towing apparatus 12 is not mounted to trailer hitch 38 to provide stabilizing support for towing apparatus 12 in combination with trailer wheel 30. Adjustable support 32 is shown in retracted position 69 (see also, FIG. 4). When adjustable support 32 is operated to extended position 70, right caster wheel 72 and left caster wheel 74 provide means to engage ground surface 66 to support towing apparatus 12 (see FIG. 4). Control arm 36 is pivotably attached to frame member 24 adjacent distal end 64 of frame member 24. Control arm 36 pivots relative to frame member 24 about axis 68 where axis 68 is parallel to first axis 58 (see also, FIGS. 5 and 8). Trailer wheel 30 supports control arm 36 on ground surface 66 where trailer wheel 30 is rotatably attached to a distal end 70 of control arm 36. Trailer wheel 30 rotates about axis 76 which is parallel to axis 68. Dampening assembly 34 is attached at a lower end 78 at a point between proximal end 80 and distal end 70 of control arm 36. Dampening assembly 34 is attached at an upper end 82 to distal end 64 of frame member 24. Dampening assembly 34 resiliently supports frame member 24 on control arm 36.

Figure 3:
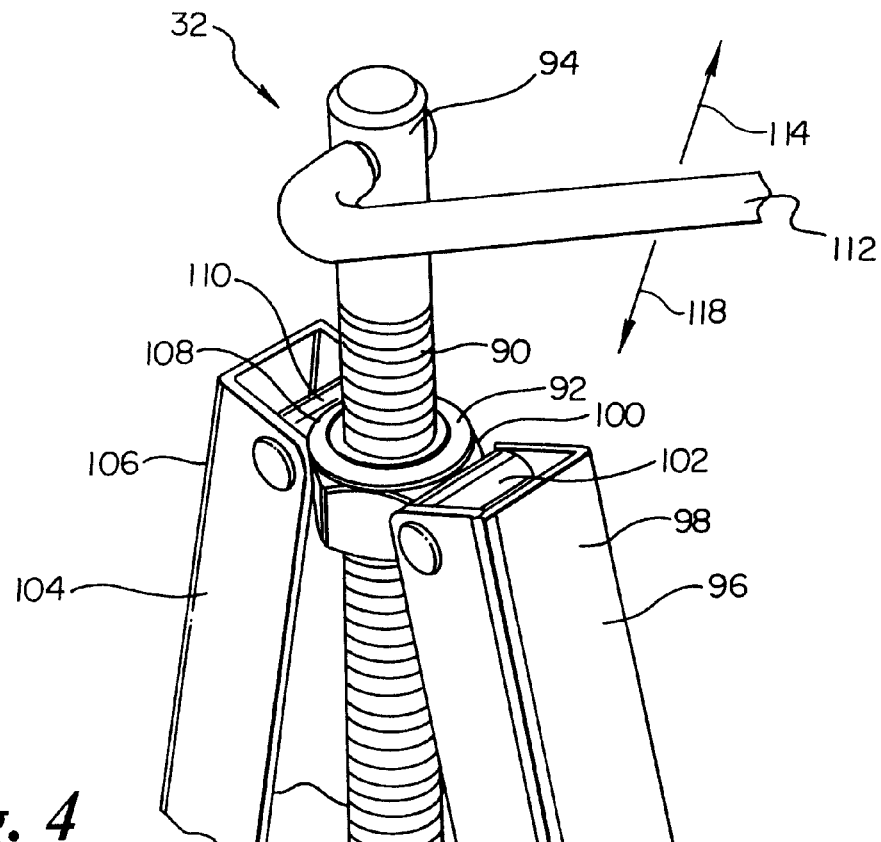
FIG. 3 is a detailed view of an upper portion of the adjustable support assembly.

FIG. 3 is a detailed view of an upper portion of adjustable support 32. Adjustable support 32 has threaded rod 90 with bolt 92 threadably attached to an upper end 94 of threaded rod 90. Right support arm 96 is hingedly attached at an upper end 98 to a right side 100 via right hinge 102 to pivot in a plane perpendicular to axis 62 of frame member 24. Left support arm 104 is hingedly attached at an upper end 106 to a left side 108 of bolt 92 via left hinge 110 to pivot in a plane perpendicular to axis 62 of frame member 24. Hand crank 112 is hingedly attached at upper end 94 of threaded rod 90 to rotate threaded rod 90. A rotation in a first direction 114 threadably moves bolt 92 downward in direction 116 to move adjustable support 32 from retracted position 69 to extended position 70. A rotation of hand crank 112 in second direction 118 moves adjustable support 32 back into retracted position 69.

Figure 4:
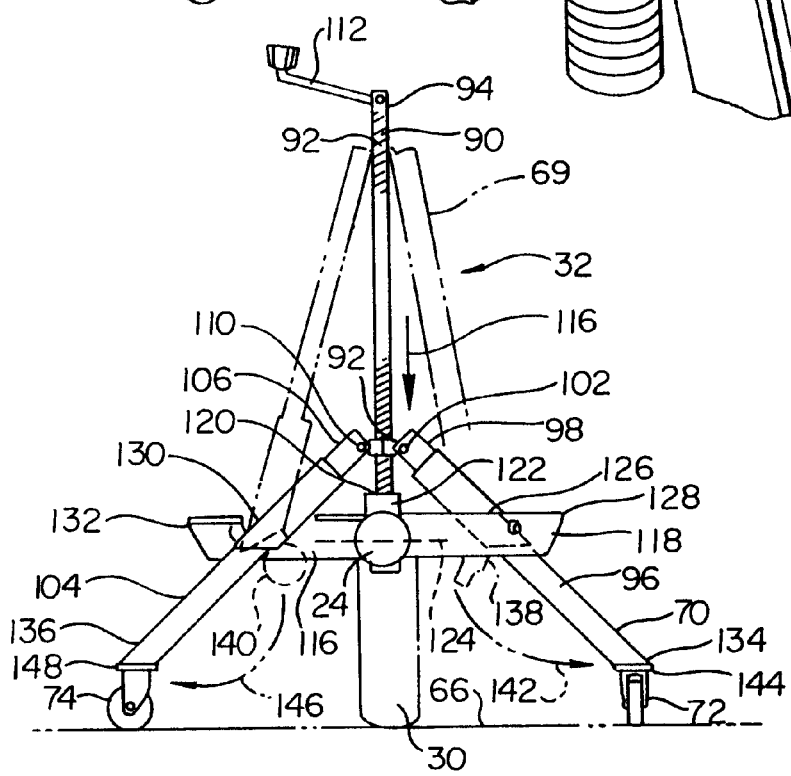
FIG. 4 is a view showing the adjustable support assembly advanced to the ground surface support position.

FIG. 4 is a view showing the adjustable support assembly advanced to contact the ground surface. Adjustable support 32 has an elongate channel base member 116 mounted perpendicular to axis 62 of frame member 24 and is approximately parallel to ground surface 66. Channel base member 116 has a downwardly open facing channel 118 which is open to ground surface 66. Threaded rod 90 is slidably supported at a lower end 120 by slidable support 122 on frame member 24. Threaded rod 90 is positioned perpendicular to the plane of axis 124 of channel base member 116 and axis 62 of frame member 24. FIG. 4 shows adjustable support 32 moved from retracted position 69 to extended position 70 in the direction of arrow 116. Right support arm 96 is slidably received and supported by right opening 126 within channel base member 116. Right opening 126 is positioned between a right end 128 and frame member 24. Left support arm 104 is slidably received and supported by a left opening 130 in channel base member 116. Left opening 130 is positioned between left end 132 and frame member 24. Right caster wheel 72 provides a right surface contact point at a lower end 134 of right support arm 96 to engage the ground surface 66 to provide support for right support arm 96. Left caster wheel 74 provides a left surface contact point attached at lower end 136 of left support arm 104 to engage the ground surface 66 to provide support for left support arm 104. Hand crank 112 is hingedly attached to an upper end 94 of threaded rod 90 to rotate threaded rod 90. A rotation in a first direction 114 slidably moves right support arm 96 through right opening 126 until right caster wheel 72 engages ground surface 66. A rotation of hand crank 112 in first direction 114 also slidably moves left support arm 104 through left opening 130 until left caster wheel 74 engages ground surface 66. Right caster wheel 72 and left caster wheel 74 being in extended position 70 and contacting ground surface 66 supports towing apparatus 12 on ground surface 66, along with a third contact point provided by trailer wheel 30 contacting ground surface 66. A rotation in a second direction 118 retracts right caster wheel 72 into a right portion 138 of channel 118 proximate right opening 126 and retracts left caster wheel 74 into left portion 140 of channel 118 proximate left opening 130. Right caster wheel 72 travels from retracted position 69 to extended position 70 along the path shown by arrow 142. Right caster wheel 72 is attached via right swivel 144 to allow right caster wheel 72 to be swiveled in any direction. Left caster wheel 74 is moved from retracted position 69 to extended position 70 in a path shown by arrow 146. Left caster wheel 74 is attached at lower end 136 of left support arm 104 by left swivel 148 to allow left caster wheel 74 to swivel to any position.

Figure 5:
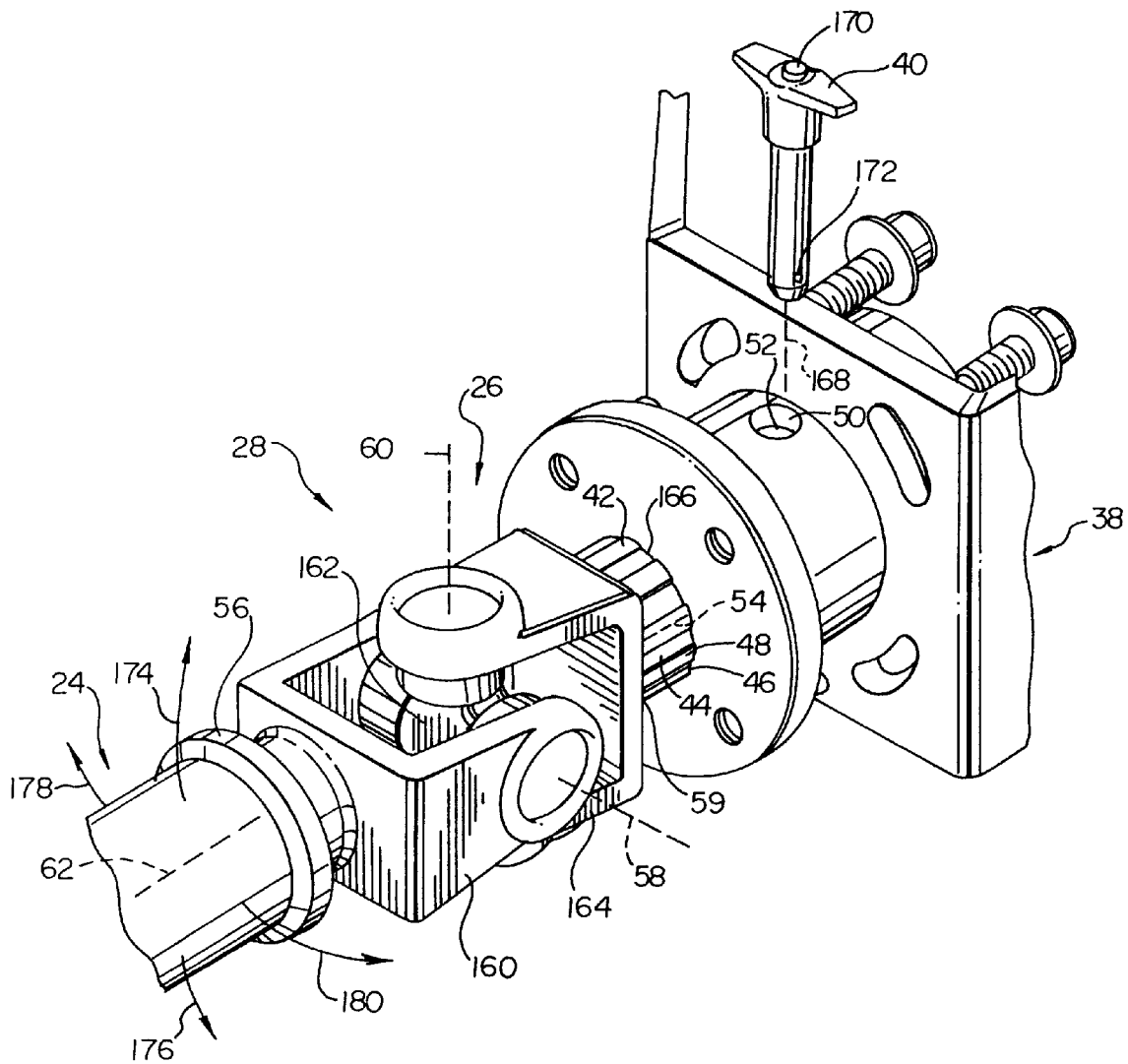
FIG. 5 is a detailed view of the universal joint assembly.

FIG. 5 is a detailed view of the universal joint assembly. Universal joint 28 includes a rear bearing caliper 160 attached at a proximal end 56 of frame member 24. The universal bearing array 162 is pivotably attached to rear bearing caliper 160 so that frame member 24 pivots about a first axis 58 of the universal bearing array 162. First axis 58 is perpendicular to axis 62 of frame member 24 and approximately parallel to ground surface 66. Frame member 24 rotates about first axis 58 of universal bearing array 162 in a plane approximately perpendicular to ground surface 66. A front bearing caliper 164 is attached to distal end 59 of hitch member 26. Front bearing caliper 164 is pivotably attached to universal bearing array 162 so that hitch member 26 may pivot about second axis 60 of universal bearing array 162. Second axis 60 is perpendicular to first axis 58 of universal bearing array 162 and is perpendicular to axis 54 of hitch member 26. Hitch member 26 has a round shaft 42 aligned with axis 54 at proximal end 46 of hitch member 26. Shaft 42 has a plurality of longitudinal splines 44 where the shaft 42 is slidably received into aligned splines 48 of bore 166 to prevent rotation of hitch member 26 about axis 54. Hitch pin 40 is removably inserted into hole 50 of trailer hitch 38 and extends into aligned bore 52 of shaft 42. Bore 52 has an axis 168 which is perpendicular to axis 54 of hitch member 26. Hitch pin 40, when inserted, prevents longitudinal movement of hitch member 26 in a direction parallel to axis 54. Hitch pin 40 comprises a locking means to lock hitch pin 40 into bore 52 of shaft 42. The locking means consists of button 170 which, when depressed, allows retraction of ball 172. Ball 172 fitably engages a cavity (not shown) within bore 52 of shaft 42, and when retracted by depression of button 170, allows hitch pin 40 to be removed from bore 52. Round shaft 42, having a plurality of longitudinal splines 44 being slidably received into aligned splines 48 of bore 166, prevents rotation of hitch member 26 about axis 54. Any shape for shaft 42 complemented by an interior shape for bore 166, which prevents rotation of hitch member 26 about axis 54, may be used. Shaft 42 may be square and slidably received into bore 166 which may also be square such that rotation of hitch member 26 about axis 54 is prevented. Thus, shaft 42 and bore 166 may be of any complementary shape which prevents rotation of hitch member 26 about axis 54. Since hitch member 26 is fixed, frame member 24 may pivot about first axis 58 in the direction shown by arrows 174 and 176, and may pivot about second axis 60 in the direction shown by arrows 178 and 180.

Figure 6:
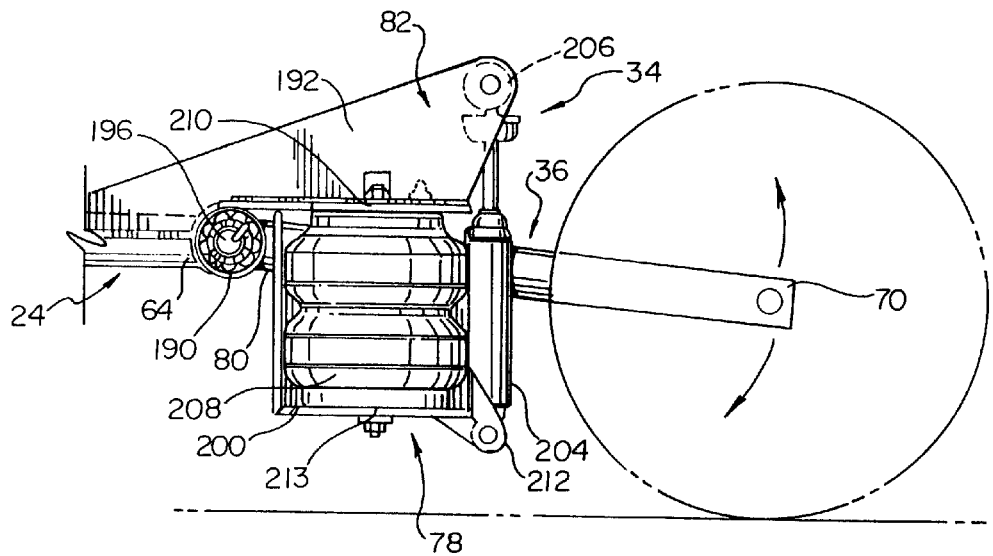
FIG. 6 is a detailed view showing the dampening assembly of a preferred embodiment of the present invention.

FIG. 6 is a detailed view showing the dampening assembly of a preferred embodiment of the present invention. One or more bearings 190 are mounted at distal end 64 of frame member 24 to provide rotational support along an axis 68 which is parallel to first axis 58 of universal bearing array 162. Upper dampening support 192 is mounted at distal end 64 of frame member 24 to support upper end 82 of dampening assembly 34. One or more bearings 190 are preferably one or more roller bearings. A pivot axle 196 is fixed at a first end 198 at proximal end 80 of control arm 36 (see also, FIG. 8). A lower dampening support 200 is mounted between proximal end 80 and distal end 70 of control arm 36 to support a lower end 78 of dampening assembly 34. A shock absorber 204 is hingely attached at an upper end 206 to the upper dampening support 192 to dampen shock and vibration between control arm 36 and frame member 24. A pneumatic air spring 208 is attached at an upper end 210 to upper dampening support 192 and at a lower end 213 to lower dampening support 200 to resiliently support frame member 24. It is understood that pneumatic air spring 208 may be replaced by any spring support means including a coil spring.

Figure 7:
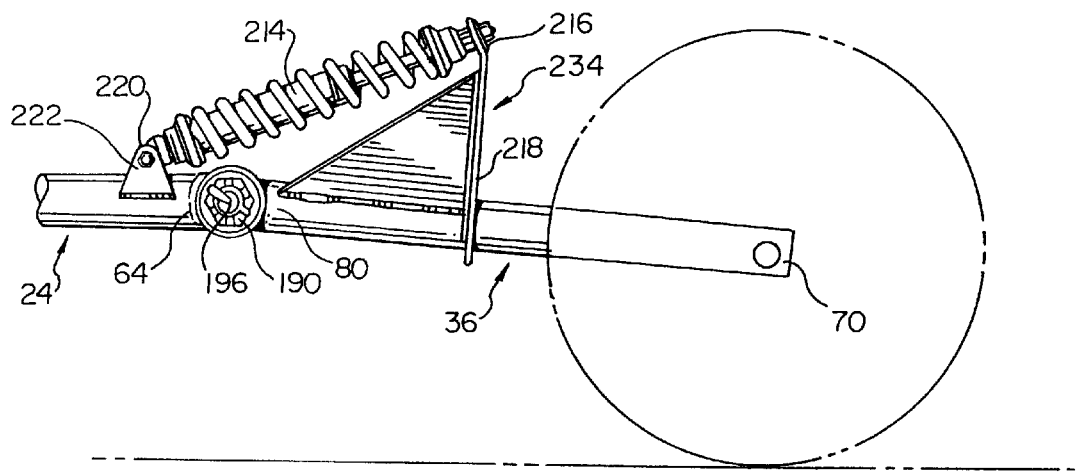
FIG. 7 is a detailed view showing the dampening assembly of an alternate embodiment of the present invention.

FIG. 7 is a detailed view showing the dampening assembly of an alternative embodiment of the present invention. FIG. 7 shows dampening assembly 234 comprising a coil over shock absorber 214 rigidly attached at an upper end 216 to upper dampening support 218 and attached at a lower end 220 to the lower dampening support 222 to dampen shock and vibration between control arm 36 and frame member 24 to resiliently support frame member 24.

FIG. 8 is a top plan view showing the dampening assembly of a preferred embodiment of the present invention. Control arm 36 has pivot axle 196 fixed at a first end 198 at proximal end 80 of control arm 36. Pivot axle 196 extends a distance perpendicular to axis 224 of control arm 36 to be rotatably supported at a second end 226 by bearings 190. Wheel axle 228 is fixed at a first end 230 of wheel axle 228 at distal end 70 of control arm 36 and extends a distance perpendicular to axis 224 of control arm 36. Wheel axle 228 is parallel to pivot axle 196 and is rotatably supported at a second end 232 by trailer wheel 30.

FIG. 9 is a top plan view showing the dampening assembly of an alternative embodiment of the present invention.

FIG. 9 shows dampening assembly 34 comprising a coil over shock absorber 214 rigidly attached at an upper end 216 of the upper dampening support 218. Coil over shock is hingedly attached at a lower end 220 to the lower dampening support 222. Coil over shock absorber dampens shock and vibration between the control arm 36 and the frame member 24 to resiliently support the frame member 24. FIGS. 6–9 shows that many different dampening assembly embodiments may be used to dampen shock and vibration between the control arm 36 and the frame member 24 and resiliently support the frame member 24.

Having thus described the preferred embodiments of the present invention, those of skill in the art will readily appreciate that yet other embodiments may be made and used within the scope of the claims hereto attached.

I claim:

1. A towing apparatus to tow behind a vehicle having a trailer hitch comprising:
   a. an elongate frame member having a substantially uniform height throughout its length;
   b. a hitch member demountably attached to the trailer hitch to couple the towing apparatus to the trailer hitch;
   c. a universal joint pivotally attached to a proximal end of said frame member and to a distal end of said hitch member to maintain said frame member and said hitch member in rotational alignment;
   d. a control arm, a proximal end of said control arm being pivotally attached to said frame member adjacent a distal end of said frame member;
   e. a trailer wheel to support said control arm on a ground surface, said trailer wheel rotatably attached to a distal end of said control arm; and
   f. a dampening assembly attached at a lower end between said proximal end and said distal end of said control arm, said dampening assembly attached at an upper end to said distal end of said frame member, said dampening assembly resiliently supporting said frame member on said control arm.

2. A towing apparatus according to claim 1 further comprising:
   a. a storage box securely attached to the frame member to provide storage capacity to hold a variety of objects, said storage box being open on a top side; and
   b. a lid hingedly attached to said top side of said storage box to provide access to the interior of said storage box, said lid being closed sealing said top side of said storage box and fully enclosing an interior of said storage box.

3. A towing apparatus according to claim 1 further comprising an adjustable support mounted between the proximal and the distal end of the frame member to support the towing apparatus on the ground surface when the towing apparatus is not mounted to the trailer hitch, said adjustable support providing stabilizing support for the towing apparatus in combination with the trailer wheel.

4. An apparatus according to claim 1 wherein the universal joint is integral to the towing apparatus with a preferred orientation and comprises:
   a. a rear bearing caliper attached at a proximal end of said frame member;
   b. a universal bearing array pivotally attached to said rear bearing caliper so that the frame member pivots about a first axis of said universal bearing array, said first axis being perpendicular to the axis of the frame member and parallel to the ground surface, the frame member rotating about the first axis of the universal bearing array in a plane perpendicular to the ground surface; and
   c. a front bearing caliper attached to a distal end of the hitch member, said front bearing caliper pivotally attached to said universal bearing array so that the hitch member pivots about a second axis of said universal bearing array, said second axis being perpendicular to said first axis of said universal bearing array and to an axis of the hitch member.

5. A towing apparatus to tow behind a vehicle having a trailer hitch comprising:
   a. an elongate frame member having proximal and distal ends and an adjustable support mounted between said proximal and said distal ends of said frame member so to support said towing apparatus on the ground surface when said towing apparatus is not mounted to the trailer hitch, said adjustable support comprising
      an elongate channeled base member mounted perpendicular to an axis of said frame member and parallel to a ground surface, said channel base member having a downwardly facing channel open to the ground surface,
      a threaded rod slideably supported at a lower end by said frame member, said threaded rod positioned perpendicular to the plane of an axis of said channeled base member and said axis of said frame member,
      a bolt threadably attached to an upper end of said threaded rod,
      a right support arm hingedly attached at an upper end to a right side of said bolt to pivot in a plane perpendicular to said axis of said frame member, said right support arm slideably received and supported by a right opening in said channeled base member, said right opening positioned between a right end and said frame member,
      a right surface contact means attached at a lower end of said right support arm to engage the ground surface and provide support for said right support arm,
      a left support arm hingedly attached at an upper end to a left side of said bolt to pivot in a plane perpendicular to said axis of the frame member, said left support arm slideably received and supported by a left opening in said channeled base member, said left opening positioned between a left end and said frame member,
      a left surface contact means attached at a lower end of said left support arm to engage the ground surface and provide support for said left support arm, and
      a hand crank hingedly attached to an upper end of said threaded rod to rotate said threaded rod, a rotation in a first direction slidably moving said right support arm through said right opening until said right surface contact means engages the ground surface, and slideably moving said left support arm through said left opening until said left surface contact means engages the ground surface, said right surface contact means and said left surface contact means supporting the towing apparatus on the ground surface, a rotation in a second direction retracting said right surface contact means into a right portion of said channel proximate said right opening, and retracting said left surface contact means into a left portion of said channel proximate said left opening;
   b. a hitch member demountably attached to the trailer hitch to couple said towing apparatus to said trailer hitch;

c. a universal joint pivotally attached to a proximal end of said frame member and to a distal end of said hitch member to maintain said frame member and said hitch member in rotational alignment;

d. a control arm, said control arm having a proximal end pivotally attached to said frame member adjacent said distal end of said frame member;

e. a trailer wheel to support said control arm on the ground surface, said trailer wheel rotatable attached to a distal end of said control arm; and f. a dampening assembly attached at a lower end between said proximal end and said distal end of said control arm, said dampening assembly attached at an upper end to said distal end of said frame member, said dampening assembly resiliently supporting said frame member on said control arm.

6. A towing apparatus according to claim 5 wherein the right surface contact means comprises a right castor wheel swivelly attached at the lower end of the right support arm, said castor wheel sized to be received in the right portion of the channel approximate the right opening.

7. A towing apparatus according to claim 5 wherein the left surface contact means comprises a left castor wheel swivelly attached at the lower end of the left support arm, said castor wheel sized to be received in the left portion of the channel approximate the left opening.

8. A towing apparatus to tow behind a vehicle having a trailer hitch comprising:

a. an elongate frame member;

b. a hitch member demountably attached to the trailer hitch to couple the towing apparatus to the trailer hitch wherein the hitch member includes a round shaft aligned with the axis of said hitch member having a plurality of longitudinal splines, said shaft being slideably received into aligned splines of a bore in the trailer hitch, said aligned splines preventing rotation of said hitch member about the axis of said hitch member, and a hitch pin being removably inserted in the trailer hitch and extending into an aligned bore of said shaft, said bore having an axis perpendicular to the axis of said hitch member, said hitch pin being inserted preventing longitudinal movement of said hitch member in a direction parallel to the axis of said hitch member;

c. a universal joint pivotally attached to a proximal end of said frame member and to a distal end of said hitch member to maintain said frame member and said hitch member in rotational alignment;

d. a control arm, a proximal end of said control arm being pivotally attached to said frame member adjacent a distal end of said frame member;

e. a trailer wheel to support said control arm on a ground surface, said trailer wheel rotatable attached to a distal end of said control arm; and f. a dampening assembly attached at a lower end between said proximal end and said distal end of said control arm, said dampening assembly attached at an upper end to said distal end of said frame member, said dampening assembly resiliently supporting said frame member on said control arm.

9. An apparatus according to claim 8 wherein the hitch pin comprises a locking means to lock the hitch pin in the aligned bore of the shaft, the hitch pin being removable from the aligned bore of the shaft when the locking means is released.

10. A towing apparatus to tow behind a vehicle having a trailer hitch comprising:

a. an elongate frame member;

b. a hitch member demountably attached to the trailer hitch to couple the towing apparatus to the trailer hitch wherein the hitch member includes a splined shaft aligned with the axis of said hitch member, said shaft being mated with and slidably received into a mating bore of the trailer hitch, said mating bore preventing rotation of said hitch member about the axis of said hitch member, and a hitch pin being removably inserted in the trailer hitch and extending into an aligned bore of said shaft, said bore having an axis perpendicular to the axis of said hitch member, said hitch pin being inserted preventing longitudinal movement of said hitch member in a direction parallel to the axis of said hitch member;

c. a universal joint pivotally attached to a proximal end of said frame member and to a distal end of said hitch member to maintain said frame member and said hitch member in rotational alignment;

d. a control arm, a proximal end of said control arm being pivotally attached to said frame member adjacent a distal end of said frame member;

e. a trailer wheel to support said control arm on a ground surface, said trailer wheel rotatably attached to a distal end of said control arm; and f. a dampening assembly attached at a lower end between said proximal end and said distal end of said control arm, said dampening assembly attached at an upper end to said distal end of said frame member, said dampening assembly resiliently supporting said frame member on said control arm.

11. An apparatus according to claim 10 wherein the hitch pin comprises a locking means to lock the hitch pin in the aligned bore of the shaft, the hitch pin being removable from the aligned bore of the shaft when the locking means is released.

12. A towing apparatus according to claim 4 wherein the frame member comprises:

a. one or more bearings mounted at the distal end of the frame member to provide rotational support along an axis parallel to the first axis of the universal bearing array; and b. an upper dampening support mounted at the distal end of the frame member to support an upper end of the dampening assembly.

13. A towing apparatus according to claim 12 wherein the one or more bearings are one or more roller bearings.

14. A towing apparatus according to claim 13 wherein the control arm comprises a. a pivot axle fixed at a first end at the proximal end of the control arm, said pivot axle extending a distance perpendicular to the axis of the control arm, said pivot axle rotatably supported at a second end by said one or more bearings;

b. a wheel axle fixed at a first end at the distal end of the control arm, said wheel axle extending a distance perpendicular to the axis of the control arm, said wheel axle parallel to said pivot axle, said wheel axle rotatably supported at a second end by the trailer wheel; and c. a lower dampening support mounted between the proximal and the distal end of the control arm to support a lower end of the dampening assembly.

15. A towing apparatus according to claim 14 wherein the dampening assembly comprises:

a. a shock absorber hingedly attached at an upper end to the upper dampening support and at a lower end to the lower dampening support to dampen shock and vibration between the control arm and the frame member; and b. a spring support means attached at an upper end to the upper dampening support and at a lower end to the lower dampening support to resiliently support the frame member, the upper end of the dampening assembly consisting of said upper end of said shock absorber and said upper end of said spring support means, the lower end of the dampening assembly consisting of said lower end of said shock absorber and said lower end of said spring support means.

16. A towing apparatus to tow behind a vehicle having a trailer hitch comprising:

a. an elongate frame member;

b. a hitch member demountably attached to the trailer hitch to couple the towing apparatus to the trailer hitch;

c. a universal joint pivotally attached to a proximal end of said frame member and to a distal end of said hitch member to maintain said frame member and said hitch member in rotational alignment;

d. a control arm, a proximal end of said control arm being pivotally attached to said frame member adjacent a distal end of said frame member;

e. a trailer wheel to support said control arm on a ground surface, said trailer wheel rotatably attached to a distal end of said control arm; and f. a dampening assembly attached at a lower end between said proximal end and said distal end of said control arm, said dampening assembly attached at an upper end to said distal end of said frame member, said dampening assembly resiliently supporting said frame member on said control arm;

g. a round shaft aligned with the axis of the hitch member having a plurality of longitudinal splines, said shaft being slidably received into aligned splines of a bore in the trailer hitch, said aligned splines preventing rotation of the hitch member about the axis of the hitch member; and h. a hitch pin being removably inserted in the trailer hitch and extending into an aligned bore of said shaft, said bore having an axis perpendicular to the axis of the hitch member, said hitch pin being inserted preventing longitudinal movement of the hitch member in a direction parallel to the axis of the hitch member.

17. An apparatus according to claim 16 wherein the hitch pin comprises a locking means to lock the hitch pin in the aligned bore of the shaft, the hitch pin being removable from the aligned bore of the shaft when the locking means is released.

18. The apparatus of claim 16 further comprising:

a. a storage box securely attached to said frame member to provide storage capacity to hold a variety of objects, said storage box being open on a top side; and b. a lid hingedly attached to said top side of said storage box to provide access to the interior of said storage box, said lid being closed sealing said top side of said storage box and fully enclosing an interior of said storage box.

19. The apparatus of claim 16 wherein said frame member further comprises an adjustable support mounted between the proximal and the distal end of said frame member to support the towing apparatus on the ground surface when the towing apparatus is not mounted to the trailer hitch, said adjustable support providing stabilizing support for the towing apparatus in combination with said trailer wheel.

20. A towing apparatus to tow behind a vehicle having a trailer hitch comprising:

a. an elongate frame member;

b. a hitch member demountably attached to the trailer hitch to couple the towing apparatus to the trailer hitch;

c. a universal joint pivotally attached to a proximal end of said frame member and to a distal end of said hitch member to maintain said frame member and said hitch member in rotational alignment;

d. a control arm, a proximal end of said control arm being pivotally attached to said frame member adjacent a distal end of said frame member;

e. a trailer wheel to support said control arm on a ground surface, said trailer wheel rotatably attached to a distal end of said control arm; and f. a dampening assembly attached at a lower end between said proximal end and said distal end of said control arm, said dampening assembly attached at an upper end to said distal end of said frame member, said dampening assembly resiliently supporting said frame member on said control arm;

g. a splined shaft aligned with the axis of the hitch member, said shaft being mated with and slidably received into a mating bore of the trailer hitch, said mating bore preventing rotation of the hitch member about the axis of the hitch member; and h. a hitch pin being removably inserted in the trailer hitch and extending into an aligned bore of said shaft, said bore having an axis perpendicular to the axis of the hitch member, said hitch pin being inserted preventing longitudinal movement of the hitch member in a direction parallel to the axis of the hitch member.

21. An apparatus according to claim 20 wherein the hitch pin comprises a locking means to lock the hitch pin in the aligned bore of the shaft, the hitch pin being removable from the aligned bore of the shaft when the locking means is released.

22. The apparatus of claim 20 further comprising:

a. a storage box securely attached to said frame member to provide storage capacity to hold a variety of objects, said storage box being open on a top side; and b. a lid hingedly attached to said top side of said storage box to provide access to the interior of said storage box, said lid being closed sealing said top side of said storage box and fully enclosing an interior of said storage box.

23. The apparatus of claim 20 wherein said frame member further comprises an adjustable support mounted between the proximal and the distal end of said frame member to support the towing apparatus on the ground surface when the towing apparatus is not mounted to the trailer hitch, said adjustable support providing stabilizing support for the towing apparatus in combination with said trailer wheel.

24. A towing apparatus to tow behind a vehicle having a trailer hitch comprising:

a. an elongate frame member further comprising:

i) one or more roller bearings mounted at the distal end of the frame member to provide rotational support along an axis parallel to the first axis of the universal bearing array; and ii an upper dampening support mounted at the distal end of the frame member to support an upper end of the dampening assembly;

b. a hitch member demountably attached to the trailer hitch to couple the towing apparatus to the trailer hitch;

c. a universal joint pivotally attached to a proximal end of said frame member and to a distal end of said hitch member to maintain said frame member and said hitch member in rotational alignment, said universal joint comprising;

i). a rear bearing caliper attached at a proximal end of said frame member;

ii) a universal bearing array pivotally attached to said rear bearing caliper so that the frame member pivots about a first axis of said universal bearing array, said first axis being perpendicular to the axis of the frame member and parallel to the ground surface, the frame member rotating about the first axis of the universal bearing array in a plane perpendicular to the ground surface; and iii) a front bearing caliper attached to a distal end of the hitch member, said front bearing caliper pivotally attached to said universal bearing array so that the hitch member pivots about a second axis of said universal bearing array, said second axis being perpendicular to said first axis of said universal bearing array and to an axis of the hitch member;

d. a control arm, a proximal end of said control arm being pivotally attached to said frame member adjacent a distal end of said frame member, said control arm comprising;

i) a pivot axle fixed at a first end at the proximal end of the control arm, said pivot axle extending a distance perpendicular to the axis of the control arm, said pivot axle rotatably supported at a second end by said one or more bearings;

ii) a wheel axle fixed at a first end at the distal end of the control arm, said wheel axle extending a distance perpendicular to the axis of the control arm, said wheel axle parallel to said pivot axle, said wheel axle rotatably supported at a second end by the trailer wheel; and iii) a lower dampening support mounted between the proximal and the distal end of the control arm to support a lower end of the dampening assembly;

e. a trailer wheel to support said control arm on a ground surface, said trailer wheel rotatably attached to a distal end of said control arm; and f. a dampening assembly attached at a lower end between said proximal end and said distal end of said control arm, said dampening assembly attached at an upper end to said distal end of said frame member, said dampening assembly resiliently supporting said frame member on said control arm, said dampening assembly comprising:

i) a shock absorber hingedly attached at an upper end to the upper dampening support and at a lower end to the lower dampening support to dampen shock and vibration between the control arm and the frame member; and ii) a spring support means comprised of a coil spring attached at an upper end to the upper dampening support and at a lower end to the lower dampening support to resiliently support the frame member, the upper end of the dampening assembly consisting of said upper end of said shock absorber and said upper end of said spring support means, the lower end of the dampening assembly consisting of said lower end of said shock absorber and said lower end of said spring support means.

25. A towing apparatus to tow behind a vehicle having a trailer hitch comprising:

a. an elongate frame member further comprising:

i) one or more roller bearings mounted at the distal end of the frame member to provide rotational support along an axis parallel to the first axis of the universal bearing array; and ii an upper dampening support mounted at the distal end of the frame member to support an upper end of the dampening assembly;

b. a hitch member demountably attached to the trailer hitch to couple the towing apparatus to the trailer hitch;

c. a universal joint pivotally attached to a proximal end of said frame member and to a distal end of said hitch member to maintain said frame member and said hitch member in rotational alignment, said universal joint comprising;

i). a rear bearing caliper attached at a proximal end of said frame member;

ii) a universal bearing array pivotally attached to said rear bearing caliper so that the frame member pivots about a first axis of said universal bearing array, said first axis being perpendicular to the axis of the frame member and parallel to the ground surface, the frame member rotating about the first axis of the universal bearing array in a plane perpendicular to the ground surface; and iii) a front bearing caliper attached to a distal end of the hitch member, said front bearing caliper pivotally attached to said universal bearing array so that the hitch member pivots about a second axis of said universal bearing array, said second axis being perpendicular to said first axis of said universal bearing array and to an axis of the hitch member;

d. a control arm, a proximal end of said control arm being pivotally attached to said frame member adjacent a distal end of said frame member, said control arm comprising;

i) a pivot axle fixed at a first end at the proximal end of the control arm, said pivot axle extending a distance perpendicular to the axis of the control arm, said pivot axle rotatably supported at a second end by said one or more bearings;

ii) a wheel axle fixed at a first end at the distal end of the control arm, said wheel axle extending a distance perpendicular to the axis of the control arm, said wheel axle parallel to said pivot axle, said wheel axle rotatably supported at a second end by the trailer wheel; and iii) a lower dampening support mounted between the proximal and the distal end of the control arm to support a lower end of the dampening assembly;

e. a trailer wheel to support said control arm on a ground surface, said trailer wheel rotatably attached to a distal end of said control arm; and f. a dampening assembly attached at a lower end between said proximal end and said distal end of said control arm, said dampening assembly attached at an upper end to said distal end of said frame member, said dampening assembly resiliently supporting said frame member on said control arm, said dampening assembly comprising a coil-over shock absorber rigidly attached at an upper end to the upper dampening support and hingedly attached at a lower end to the lower dampening support to dampen shock and vibration between the control arm and the frame member and to resiliently support the frame member.

26. A towing apparatus to tow behind a vehicle having a trailer hitch comprising:
   a. an elongate frame member wherein the frame member comprises an adjustable support mounted between the proximal and the distal end of the frame member to support the towing apparatus at two points on the ground surface when the towing apparatus is not mounted to the trailer hitch, wherein the adjustable support comprises:
      i) an elongate channeled base member mounted perpendicular to an axis of the frame member and parallel to the ground surface, said channel base member having a downwardly facing channel open to the ground surface;
      ii) a threaded rod slidably supported at a lower end by said frame member, said threaded rod positioned perpendicular to the plane of an axis of said channeled base member and said axis of the frame member;
      iii) a bolt threadably attached to an upper end of said threaded rod;
      iv) a right support arm hingedly attached at an upper end to a right side of said bolt to pivot in a plane perpendicular to said axis of the frame member, said right support arm slidably received and supported by an right opening in said channeled base member, said right opening positioned between a right end and said frame member;
      v) a right surface contact means attached at a lower end of said right support arm to engage the ground surface and provide support for said right support arm;
      vi) a left support arm hingedly attached at an upper end to a left side of said bolt to pivot in a plane perpendicular to said axis of the frame member, said left support arm slidably received and supported by a left opening in said channeled base member, said left opening positioned between a left end and said frame member;
      vii) a left surface contact means attached at a lower end of said left support arm to engage the ground surface and provide support for said left support arm; and
      viii) a hand crank hingedly attached to an upper end of said threaded rod to rotate said threaded rod, a rotation in a first direction slidably moving said right support arm through said right opening until said right surface contact means engages the ground surface, and slidably moving said left support arm through said left opening until said left surface contact means engages the ground surface, said right surface contact means and said left surface contact means supporting the towing apparatus on the ground surface, a rotation in a second direction retracting said right surface contact means into a right portion of said channel approximate said right opening, and retracting said left surface contact means into a left portion of said channel approximate said left opening;
   b. a hitch member demountably attached to the trailer hitch to couple the towing apparatus to the trailer hitch;
   c. a universal joint pivotally attached to a proximal end of said frame member and to a distal end of said hitch member to maintain said frame member and said hitch member in rotational alignment;
   d. a control arm, a proximal end of said control arm being pivotally attached to said frame member adjacent a distal end of said frame member;
   e. a trailer wheel to support said control arm on a ground surface, said trailer wheel rotatably attached to a distal end of said control arm, said adjustable support providing stabilizing support for the towing apparatus in combination with the trailer wheel; and
   f. a dampening assembly attached at a lower end between said proximal end and said distal end of said control arm, said dampening assembly attached at an upper end to said distal end of said frame member, said dampening assembly resiliently supporting said frame member on said control arm.

27. A towing apparatus according to claim 26 wherein the right surface contact means comprises a right castor wheel swivelly attached at the lower end of the right support arm, said castor wheel sized to be received in the right portion of the channel approximate the right opening.

28. A towing apparatus according to claim 26 wherein the left surface contact means comprises a left castor wheel swivelly attached at the lower end of the left support arm, said castor wheel sized to be received in the left portion of the channel approximate the left opening.

29. A towing apparatus to tow behind a vehicle having a trailer hitch comprising:
   a. an elongate frame member further comprising:
      i) one or more roller bearings mounted at the distal end of the frame member to provide rotational support along an axis parallel to the first axis of the universal bearing array; and
      ii an upper dampening support mounted at the distal end of the frame member to support an upper end of the dampening assembly;
   b. a hitch member demountably attached to the trailer hitch to couple the towing apparatus to the trailer hitch;
   c. a universal joint pivotally attached to a proximal end of said frame member and to a distal end of said hitch member to maintain said frame member and said hitch member in rotational alignment, said universal joint comprising;
      i). a rear bearing caliper attached at a proximal end of said frame member;
      ii) a universal bearing array pivotally attached to said rear bearing caliper so that the frame member pivots about a first axis of said universal bearing array, said first axis being perpendicular to the axis of the frame member and parallel to the ground surface, the frame member rotating about the first axis of the universal bearing array in a plane perpendicular to the ground surface; and
      iii) a front bearing caliper attached to a distal end of the hitch member, said front bearing caliper pivotally attached to said universal bearing array so that the hitch member pivots about a second axis of said universal bearing array, said second axis being perpendicular to said first axis of said universal bearing array and to an axis of the hitch member;
   d. a control arm, a proximal end of said control arm being pivotally attached to said frame member adjacent a distal end of said frame member, said control arm comprising;
      i) a pivot axle fixed at a first end at the proximal end of the control arm, said pivot axle extending a distance perpendicular to the axis of the control arm, said pivot axle rotatably supported at a second end by said one or more bearings;
      ii) a wheel axle fixed at a first end at the distal end of the control arm, said wheel axle extending a distance perpendicular to the axis of the control arm, said wheel axle parallel to said pivot axle, said wheel axle rotatably supported at a second end by the trailer wheel; and iii) a lower dampening support mounted between the proximal and the distal end of the control arm to support a lower end of the dampening assembly;

e. a trailer wheel to support said control arm on a ground surface, said trailer wheel rotatably attached to a distal end of said control arm; and f. a dampening assembly attached at a lower end between said proximal end and said distal end of said control arm, said dampening assembly attached at an upper end to said distal end of said frame member, said dampening assembly resiliently supporting said frame member on said control arm, said dampening assembly comprising:

i) a shock absorber hingedly attached at an upper end to the upper dampening support and at a lower end to the lower dampening support to dampen shock and vibration between the control arm and the frame member; and ii) a spring support means comprised of a pneumatic air spring attached at an upper end to the upper dampening support and at a lower end to the lower dampening support to resiliently support the frame member, the upper end of the dampening assembly consisting of said upper end of said shock absorber and said upper end of said spring support means, the lower end of the dampening assembly consisting of said lower end of said shock absorber and said lower end of said spring support means.

* * * * *